Oct. 20, 1953     R. P. HEUER     2,656,279
UNBURNED REFRACTORY BRICK
Filed June 12, 1950
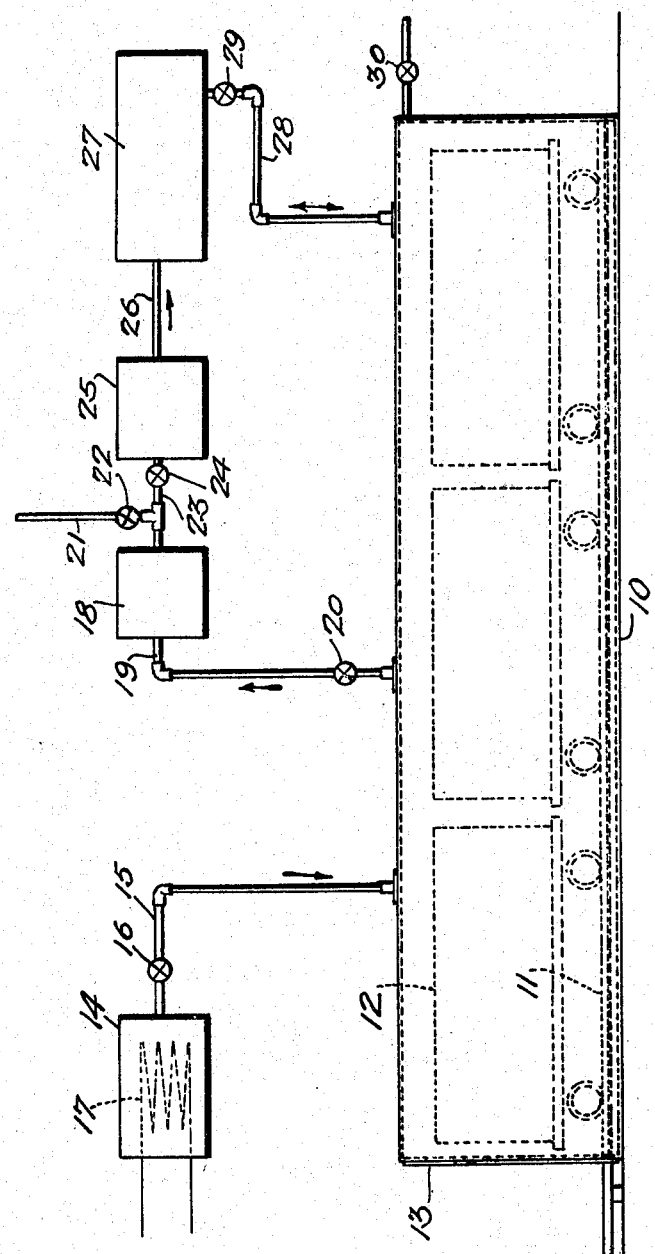
INVENTOR.
Russell Pearce Heuer:
BY
ATTORNEYS Patented Oct. 20, 1953

2,656,279

UNITED STATES PATENT OFFICE 2,656,279

UNBURNED REFRACTORY BRICK

Russell Pearce Heuer, Villanova, Pa., assignor to General Refractories Company, a corporation of Pennsylvania Application June 12, 1950, Serial No. 167,538

2 Claims. (Cl. 106—58)

My invention relates to the manufacture of refractory brick which are suitable for use without kiln firing.

The present application is a continuation-in-part of my U. S. application Serial No. 756,001, filed June 20, 1947, for Unburned Refractory Brick Making, now U. S. Patent No. 2,547,323, granted April 3, 1951, which is directed to the process.

A purpose of my invention is to reduce the cost of production of refractory brick, lower the thermal conductivity and increase the resistance to spalling and rapid temperature changes.

A further purpose is to bond non-acid refractory brick consisting essentially of magnesia, chromite or mixtures of the same, by chemically combining with carbon dioxide, thereby producing a strong bond in the brick without kiln firing.

A further purpose is to make up a moistened basic refractory brick mix, consisting of magnesia, chromite or mixtures of the same, preferably containing at least 5% of magnesia and most desirably containing at least 10%, to mold the mixture into brick, preferably to evacuate air around the brick, to treat the brick with carbon dioxide gas preferably in excess and at superatmospheric pressure, preferably at ordinary temperature and for a time of at least one hour, then desirably to evacuate and store the surplus carbon dioxide and to dry the brick. The surplus carbon dioxide will desirably be used for treating other brick.

A further purpose is to employ a treating gas containing carbon dioxide and permissibly impurities of oxygen and nitrogen.

A further purpose is to employ a superatmospheric pressure of about one atmosphere and a time of treatment of about five hours.

Further purposes appear in the specification and in the claims.

In the drawings I have chosen to illustrate one only of the many embodiments in which my invention might appear, choosing the forms shown from the standpoints of convenience in illustration, satisfactory operation, and clear demonstration of the principles involved.

The figure shows diagrammatically typical apparatus for carrying out the invention.

Describing in illustration, but not in limitation and referring to the drawing.

In the prior art it is common practice to produce refractory brick without kiln firing, particularly to avoid the expense of such firing. Such unfired brick are especially well known in the non-acid refractory field where the brick consist essentially of magnesia (periclase or dead burned magnesite), chromite or mixtures of magnesia and chromite. In such unfired brick it is necessary to obtain without kiln firing a bond which is strong enough to permit handling and shipping from the point of origin to the point of use, and installation and at least initial heating in a furnace at the point of use.

Numerous prior art bonding agents have been proposed for such unfired brick. Among those used are sodium silicate, organic bonding agents such as lignin residues, sulfuric acid, sodium sulfate, magnesium sulfate, calcium chloride and the like. These bonding agents are generally incorporated in the refractory mix when it is moistened with water in the tempering process. The tempered mix is then formed into refractory brick (here used to designate any suitable refractory shape) under pressure. The brick are dried and are then ready for use.

The prior art bonds have been open to certain disadvantages. In some cases they have not adequately strengthened the brick so that they are not capable of handling for shipment and installation without considerable loss. In other cases the brick are subject to excessive spalling during initial heating in the furnace during use. Some bonds detract from the refractoriness of the brick.

I have discovered that a superior bond may be obtained without the disadvantage above noted and without the expense of kiln firing by subjecting the brick to the action of gaseous carbon dioxide, under conditions such that it can combine with the brick. Not only is the product thus produced superior to other unfired non-acid refractory brick, but it also possesses definite advantages over kiln fired brick. As compared with kiln fired brick, the brick of the present invention is lower in cost, has lower thermal conductivity and has greater resistance to spalling and rapid temperature changes.

It will be evident that while in use the hot end of an unfired brick will often become hot enough so that it is effectively a fired brick after extended use in a furnace lining. The cold end of the brick usually retains its unfired character throughout the campaign of the lining, and the physical and other characteristics which make the bond of the present invention desirable during manufacturing, shipping and installation of the brick persist in the cold end and likewise improve the character in the intermediate zone between the hot and the cold end where spalling is most likely to occur.

The raw material of the brick mix will desirably correspond to that of previous non-acid brick manufacture. The brick mix may consist of magnesia (periclase or dead burned magnesite)

or chromite or mixtures of magnesia and chromite. While the invention offers some advantage when chromite alone is used, it achieves its greatest effectiveness when a substantial amount of magnesia is present in the mix. When chromite alone is present the effectiveness of the invention is dependent upon the impurities which are present in chromite. The brick mix should preferably contain at least 5% of magnesia, and most desirably should contain at least 10% by weight.

A typical example of the invention employs a non-acid refractory mix comprising the following:

|   | Percent |
|---|---|
| Coarse chromite passing 6 mesh and resting upon 28 mesh | 50 |
| Fine chromite passing through 65 mesh | 25 |
| Fine dead burned magnesite passing through 65 mesh | 25 |
|   | 100 |

It will be noted that this mixture conforms to the principle of gap sizing as set forth in my U. S. Patents 1,851,181; 1,992,482; 1,992,483.

This mixture is moistened with water to the desired molding consistency (usually about 3% water) and pressed into the shape of the desired brick at a high pressure. I find that the molding pressure should be at least 8000 p. s. i., and that a molding pressure in excess of 8000 p. s. i. is very desirable for best results.

In order to obtain most effective bonding action, the brick should still be moist when subjected to the treatment with carbon dioxide. Accordingly the brick are not dried, nor exposed to extended air contact which would permit drying before the carbon dioxide treatment.

A treating chamber 10 is provided of steel or similar construction, preferably welded for gas tightness, and having a bottom track 11 to receive cars 12 through a removable sealed door 13. The chamber is conventionally tubular, as shown. The treating chamber is desirably constructed with sufficient strength to stand a superatmospheric pressure of at least one atmosphere and a vacuum of 29" of mercury.

The brick to be treated are charged and discharged from the treating chamber by moving the cars 12 in and out along the track. A source of carbon dioxide gas, suitably at a pressure in excess of the atmospheric pressure to be used in the treating chamber, is provided at 14, connected to the treating chamber by a pipe 15 controlled by a valve 16. The source of carbon dioxide gas may be any suitable type of carbon dioxide generator capable of supplying gas under pressure. One well known type is simply a tank containing Dry Ice. The Dry Ice is placed in the tank, the tank is closed and the Dry Ice is converted to gaseous carbon dioxide by steam introduced, for example, through a coil 17 under any suitable control.

The treating chamber 10 is also provided with a vacuum pump 18, connected to the treating chamber on the inlet side of the pump by a pipe 19 controlled by a valve 20. The vacuum pump on its discharge side may either waste gas through a pipe 21 controlled by a valve 22, or may supply it through a pipe 23 controlled by a valve 24 to the inlet side of a gas compressor 25, which feeds through a pipe 26 to a storage tank 27. The storage tank is connected with the treating chamber by a pipe 28 controlled by a valve 29 so that gas may be discharged from the treating chamber directly to the storage when the pressure in the treating chamber is adequately high and the gas in the treating chamber is adequately pure, and may also discharge gas to the treating chamber when the storage pressure is higher than that in the treating chamber.

The suitably moist brick having been placed in the treating chamber are first preferably freed from all surrounding air by sealing the door 13 and, while the valves 16 and 29 are closed, evacuation through the valve 20 and pipe 19 under action of the vacuum pump. The atmospheric gases originally present in the chamber are evacuated until a vacuum of about 25" of mercury is created in the chamber. The atmospheric gases are wasted through the valve 22 and the pipe 21.

As soon as the treating chamber is adequately free of the air the valve 22 is closed and carbon dioxide gas is introduced from the storage 27 through the valve 29 and pipe 28, if any gas is available in the storage. The valve 29 is then closed and additional gas is introduced from the source 14, building up a total gas pressure in the treating chamber preferably about 30 p. s. i. or a gauge pressure of approximately 15 p. s. i. above the atmospheric pressure. If the treating chamber has been effectively evacuated, practically the only gas present will then be carbon dioxide and the total pressure will be approximately the same as the partial pressure of the carbon dioxide present. If, however, any impurities such as nitrogen, oxygen or the like remain, the partial pressure of carbon dioxide will be permissibly reduced below the suggested absolute gas pressure of 30 p. s. i. and even below 15 p. s. i.

The feed gas to the treating chamber need not be pure carbon dioxide and may contain substantial amounts of water vapor and impurities such as nitrogen or oxygen, which are inert in the reaction. Where such inert gases are present the partial pressure of the carbon dioxide in the treating chamber can be increased by increasing the working pressure of the treating chamber. Thus a gas mixture containing 20% $CO_2$ gas would have its partial pressure of $CO_2$ increased to 30 p. s. i. if the absolute pressure were increased to about 150 p. s. i. Such condition requires suitable high pressure pumps and treating chamber, also means for bleeding the treatment chamber to remove the inert gases which remain after the $CO_2$ has been absorbed by the brick under treatment.

A substantial amount of carbon dioxide will be consumed in the reaction and, therefore, the quantity of carbon dioxide should be sufficient to provide an excess above that which will be utilized in the reaction.

The time of reaction will, of course, vary with the pressure and the temperature, but it is generally desirable to expose the brick in the treating chamber to the carbon dioxide for at least one hour and preferably for about five hours or until an adequate absorption of carbon dioxide has taken place.

The reaction temperature should preferably be approximately room temperature and very high temperatures are objectionable, as the reaction proceeds most effectively when the brick are substantially moist and a temperature high enough to drive off moisture at the particular pressure is therefore undesirable.

After a sufficient quantity of carbon dioxide has been absorbed by the brick to produce a bond of adequate strength, the valves 16 and 29, if open, are closed and connection made to the vacuum pump by opening the valve 20. If the valve 29 has been closed it may first be opened if the pressure is sufficient to force surplus gas from the treating chamber into the storage, and then closed again. With the valve 22 closed, the valve 24 open to the vacuum pump, and the compressor operating, remaining surplus carbon dioxide from the treating chamber is removed and compressed in the storage, where it is available for treating the next batch of brick.

As soon as sufficient carbon dioxide has been removed, the evacuation ceases and the treating chamber is opened for removal of the brick. Air may first be introduced through valve 30 to equalize the pressure. The brick are then preferably dried as in a tunnel drier for example, for 12 to 18 hours at 230° to 300° F. The resulting dried brick are then complete and ready for shipment.

It will be evident that the vacuum pump provides a means for preventing undue contamination of the carbon dioxide with air and also permits removal of carbon dioxide not used in a given cycle and conservation for use on the next cycle. In some cases, where the pressure level will permit, a portion of the carbon dioxide can, as noted above, be removed from the treating chamber directly to the storage by opening the valve 29, although the remainder of the gas will have to be removed by the vacuum pump feeding to the compressor.

The determination of how low a pressure level to produce under the vacuum pump will depend partly upon the economy of the process and partly upon the desire to avoid contamination of the carbon dioxide. A vacuum of 25" of mercury is very satisfactory and a vacuum of 28" of mercury is most desirable for commercial operation.

After the carbon dioxide treatment, it is very desirable to dry the brick, as at temperatures of 230° to 300° F. Higher temperatures are not recommended because they might lead to reversal of the bonding reaction or driving off of carbon dioxide, which should be retained for the purpose of the bond.

The product obtained in the previous example has unusually high strength and is particularly strong at the corners and the edges. The modulus of rupture is approximately 2,000 p. s. i. and the cold crushing strength when tested on the end of the standard brick is approximately 10,000 p. s. i. The brick can be placed directly in a furnace without kiln firing. In its lower thermal conductivity, greater resistance to spalling and to rapid temperature changes and lower cost, it is superior to a kiln dried brick for many applications.

The carbon dioxide treatment, as described in the present invention, is applicable to other types of non-acid refractories, of which the following is an example:

|  | Per cent |
|---|---|
| Coarse dead-burned magnesite passing through 6 mesh and resting upon 28 mesh | 50 |
| Fine dead-burned magnesite passing through 65 mesh | 25 |
| Fine chromite passing through 65 mesh | 25 |
|  | 100 |

The product in this example can be processed in the same way as that described in the previous example and will produce a brick of comparable quality.

The magnesia for the brick of the present invention may be conventional dead-burned magnesite or periclase produced by calcining of natural magnesite or brucite rock. Other forms of magnesia are equally suitable, such as dead-burned or fused magnesium hydrate prepared from seawater, brine or by the treatment of dolomite. The quantity of magnesia present in the refractory should be at least 5% and may be 100% of the refractory material or may constitute any intermediate percentage.

As well known in the manufacture of non-acid refractory brick, it may in some cases be desirable to incorporate some amounts of kaolin, as for example 1 to 5% by weight of the refractory mix. It may also be desirable to add organic bonding agents such as lignin residues or inorganic bonds such as sulfuric acid (about 1% by weight of the mix), the acid being about 20° Baumé.

An especially good bond is obtained by the use of dilute sulfuric acid and the carbon dioxide treatment. Refractory masses thus manufactured can be stored in conventional storage sheds without deterioration and the edges and corners do not soften when brought into contact with humid atmospheres.

The product manufactured in accordance with the present invention is suitable for use in steel melting furnaces, such as the open hearth furnace, copper and other non-ferrous furnaces, rotary cement kilns, glass melting furnaces, chemical furnaces and other high temperature apparatus. The refractory masses remain well bonded at high temperature and are free from shrinkage and other defects.

Where percentages are mentioned herein, unless otherwise indicated, they are by weight. Mesh sizes given herein are Tyler standard screen mesh per linear inch.

In view of my invention and disclosure variations and modifications to meet individual whim or particular need will doubtless become evident to others skilled in the art, to obtain all or part of the benefits of my invention without copying the product and apparatus shown, and I, therefore, claim all such insofar as they fall within the reasonable spirit and scope of my claims.

Having thus described my invention what I claim as new and desire to secure by Letters Patent is:

1. In a refractory product, a non-acid refractory brick of densely compacted form in unfired condition consisting of non-acid refractory particles selected from the class consisting of refractory magnesia and mixtures of magnesia and chromite, containing in the refractory at least 5% of refractory magnesia and a bond between the particles composed of carbon dioxide in chemical combination with the magnesia at the bond.

2. A refractory product according to claim 1 wherein about 1% of 20° Baumé sulphuric acid is used in the mixture.

RUSSELL PEARCE HEUER.

References Cited in the file of this patent

UNITED STATES PATENTS

| Number | Name | Date |
|---|---|---|
| 582,942 | McConnell | May 18, 1897 |
| 675,018 | Rueff | May 28, 1901 |
| 851,406 | Crocker | Apr. 23, 1907 |
| 1,189,904 | Avram | July 4, 1916 |
| 2,322,274 | Birch et al. | June 22, 1943 |